United States Patent
Sato et al.

(10) Patent No.: US 10,222,915 B2
(45) Date of Patent: Mar. 5, 2019

(54) INPUT DEVICE AND METHOD OF MANUFACTURING IT

(71) Applicant: ALPS ELECTRIC CO., LTD., Tokyo (JP)

(72) Inventors: Kiyoshi Sato, Niigata-ken (JP); Masayoshi Takeuchi, Niigata-ken (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 48 days.

(21) Appl. No.: 15/380,418

(22) Filed: Dec. 15, 2016

(65) Prior Publication Data

US 2017/0097705 A1 Apr. 6, 2017

Related U.S. Application Data

(63) Continuation of application No. PCT/JP2015/066821, filed on Jun. 11, 2015.

(30) Foreign Application Priority Data

Jul. 4, 2014 (JP) ................. 2014-139170

(51) Int. Cl.
  *G06F 3/044* (2006.01)
  *G06F 3/041* (2006.01)

(52) U.S. Cl.
  CPC ............ *G06F 3/044* (2013.01); *G06F 3/0416* (2013.01); *G06F 2203/04103* (2013.01)

(58) Field of Classification Search
  None
  See application file for complete search history.

(56) References Cited

U.S. PATENT DOCUMENTS

| | | | |
|---|---|---|---|
| 9,236,202 B2* | 1/2016 | Mohapatra | H01H 1/58 |
| 2004/0036827 A1 | 2/2004 | Tsuda et al. | |
| 2014/0197018 A1* | 7/2014 | Chen | G06F 3/044 |
| | | | 200/600 |

FOREIGN PATENT DOCUMENTS

| | | |
|---|---|---|
| CN | 203038255 U | 7/2013 |
| CN | 103718142 A | 4/2014 |
| CN | 103927035 A | 7/2014 |
| DE | 202013100304 U1 | 4/2013 |
| JP | 2004-85720 A | 3/2004 |
| JP | 2007-018226 A | 1/2007 |
| JP | 2009-199107 A | 9/2009 |
| JP | 2011-76386 A | 4/2011 |

(Continued)

OTHER PUBLICATIONS

International Search Report for corresponding International Patent Application No. PCT/JP2015/066821, dated Aug. 18, 2015, pp. 1-5.

*Primary Examiner* — Kenneth B Lee, Jr.
(74) *Attorney, Agent, or Firm* — Brinks Gilson & Lione (57) ABSTRACT

First electrode layers are formed from an ITO layer on one surface of a substrate formed from a PET film. The surfaces of the first electrode layers are covered with an insulating layer formed from a dry film resist or the like. Second electrode layers are formed on the surface of the insulating layer in a printing process. The second electrode layer is formed from conductive nanowires or conductive nanotubes. After that, first wiring layers brought into conduction with the first wiring layers and second wiring layers brought into conduction with the second electrode layers are formed.

23 Claims, 7 Drawing Sheets

(56) References Cited

FOREIGN PATENT DOCUMENTS

| | | |
|---|---|---|
| JP | 2013-069242 A | 4/2013 |
| JP | 3182680 U | 4/2013 |
| JP | 2013-156725 A | 8/2013 |
| JP | 2013-161343 A | 8/2013 |
| JP | 2014-520326 A | 8/2014 |
| KR | 101191949 B1 | 10/2012 |
| KR | 20140004373 U | 7/2014 |
| TW | 201428586 A | 7/2014 |
| WO | WO 2007-008518 A2 | 1/2007 |
| WO | WO 2012-177032 A2 | 12/2012 |

\* cited by examiner

INPUT DEVICE AND METHOD OF MANUFACTURING IT

CLAIM OF PRIORITY

This application is a Continuation of International Application No. PCT/JP2015/066821 filed on Jun. 11, 2015, which claims benefit of priority to Japanese Patent Application No. 2014-139170 filed on Jul. 4, 2014. The entire contents of each application noted above are hereby incorporated by reference.

BACKGROUND

1. Field of the Disclosure

The present disclosure relates to a capacitive-type input device in which first electrode layers and second electrode layers are placed on a translucent substrate so as to be insulated from each other and to a method of manufacturing the input device.

2. Description of the Related Art

In various types of information processing apparatuses, a translucent input device is placed in front of a color liquid crystal display panel. This type of input device, called a touch panel, has capacitances among electrodes so that when a finger of a person approaches the touch panel, the access position of the finger can be determined on coordinates from a change in movement of electric charges due to the approach of the finger.

One type of input device is structured so that X electrodes are formed on one of two translucent substrates and Y electrodes are formed on the other, after which the two translucent substrates are overlaid so as to form a capacitance between each X electrode and its corresponding Y electrode. In this structure, however, since two translucent substrates are needed, the number of parts is increased. Furthermore, since processes to, for example, mutually align the two translucent substrates, laminate them, and mutually bond them are needed, man-hours are increased. This leads to the problem that the manufacturing costs are increased.

Recently, input devices are emerging in which many electrodes are formed on one surface of a single translucent substrate so as to form capacitances among the electrodes. Since, in this method, the structure has only one translucent substrate, the number of parts is small and the number of manufacturing man-hours can be reduced. However, many electrodes need to be formed on one surface of the translucent substrate and many wiring layers that individually extend from their relevant electrode layers need to be formed. Therefore, the width dimension of each wiring layer needs to be small, leading to the drawback that wire resistances become large. In particular, if a large input device is structured, an individual wire becomes long, so the wire resistances become further large. A possible solution to this is to increase the width dimension of each wiring layer. If the width of the wiring layer is increased, however, the wiring density of electrode layers needs to be lowered and the resolution of detection is thereby lowered. If, for example, a so-called multi-touch method, in which a manipulation made by a plurality of fingers is detected, is used, detection precision is lowered.

An invention related to a capacitive-type touch panel that uses a single transparent substrate is described in Japanese Unexamined Patent Application Publication No. 2011-76386.

With this touch-panel, first electrode layers are formed on a transparent substrate and the first electrode layers are covered with a transparent insulating layer. Second electrode layers are formed on the surface of the insulating layer so that capacitances are formed between the first electrode layers and the second electrode layers.

With the touch panel described in Japanese Unexamined Patent Application Publication No. 2011-76386, since the first electrode layers and second electrode layers are formed on one surface of a transparent substrate, the number of substrates can be reduced and costs can thereby be reduced. With this touch panel, however, both the first electrode layer and second electrode layer are formed from an ITO film. As for an electrode layer formed from an ITO film, it is necessary to form an ITO film on an electrode forming surface in a sputtering process and further to form an electrode pattern in a wet etching process. If, however, both the first electrode layer and second electrode layer are formed in the sputtering process and etching process, the number of manufacturing processes is increased and it is difficult to reduce the manufacturing costs.

In addition, what is the insulating layer positioned between the first electrode layers and the second electrode layers is like is not described in Japanese Unexamined Patent Application Publication No. 2011-763861. To sputter an ITO layer on the insulating layer, however, it is necessary to form the insulating layer from an inorganic oxide or the like in a sputtering process or the like. If all of the first electrode layers and second electrode layers need to be formed in a sputtering process, the manufacturing processes become further complex and the manufacturing costs become high. In addition, if the insulating layer is formed from an inorganic oxide, the flexibility of the touch panel is lowered. Even if, for example, the substrate is formed from a resin film, it becomes difficult to, for example, flexibly deform the touch panel.

SUMMARY

An input device has a structure in which two types of electrode layers are disposed on one surface of a substrate so as to be insulated from each other and an increase in wire resistance can be suppressed.

An input device manufacturing method is disclosed by which a lamination structure in which two types of electrode layers are formed on one surface of a substrate so as to be insulated from each other can be achieved in a small number of man-hours and simple processes.

In an input device in which a plurality of translucent first electrode layers and a plurality of translucent second electrode layers are provided on a translucent substrate so as to be insulated from each other, wherein:

the first electrode layers and first wiring layers brought into conduction with the first electrode layers are formed on a surface of the substrate;

the first electrode layers are covered with a translucent insulating layer, and the second electrode layers, which include conductive nanomaterials, are provided on the surface of the insulating layer; and second wiring layers connected to the second electrode layers on the surface of the insulating layer extend to the surface of the substrate.

DESCRIPTION OF THE EXEMPLARY EMBODIMENTS

Figure 3A:
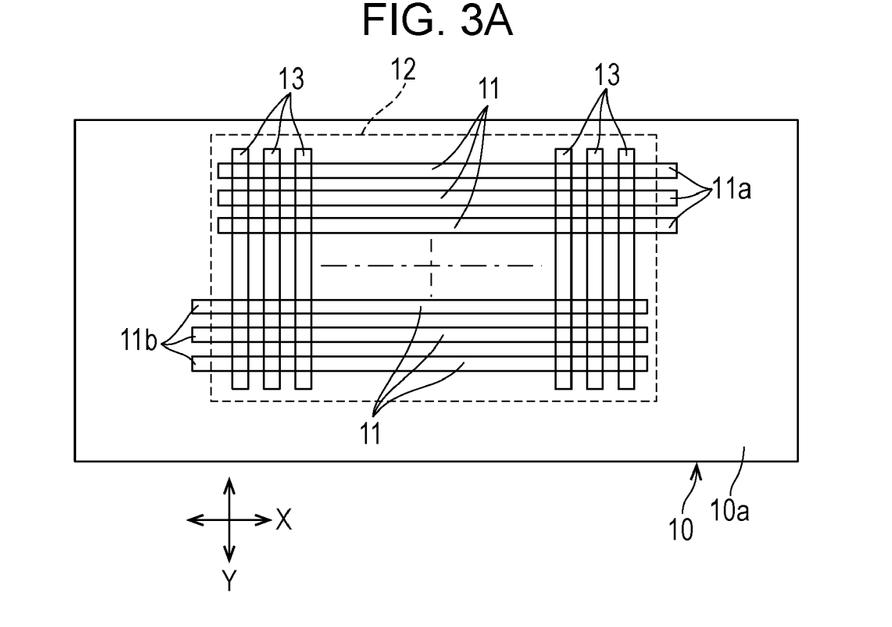
FIGS. 3A and 3B illustrate a process in which second electrode layers have been formed on the surface of the insulating layer in the method of manufacturing the input device in the first embodiment of the present invention, FIG. 3A being a plan view, FIG. 3B being a side view.
Figure 3B:
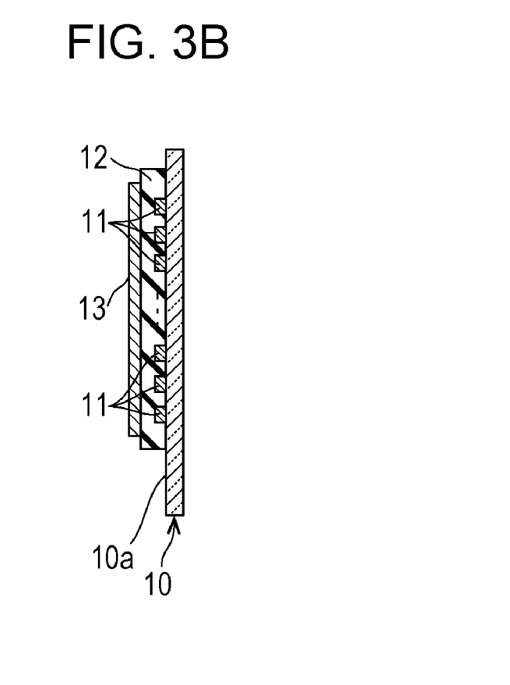
Figure 4A:
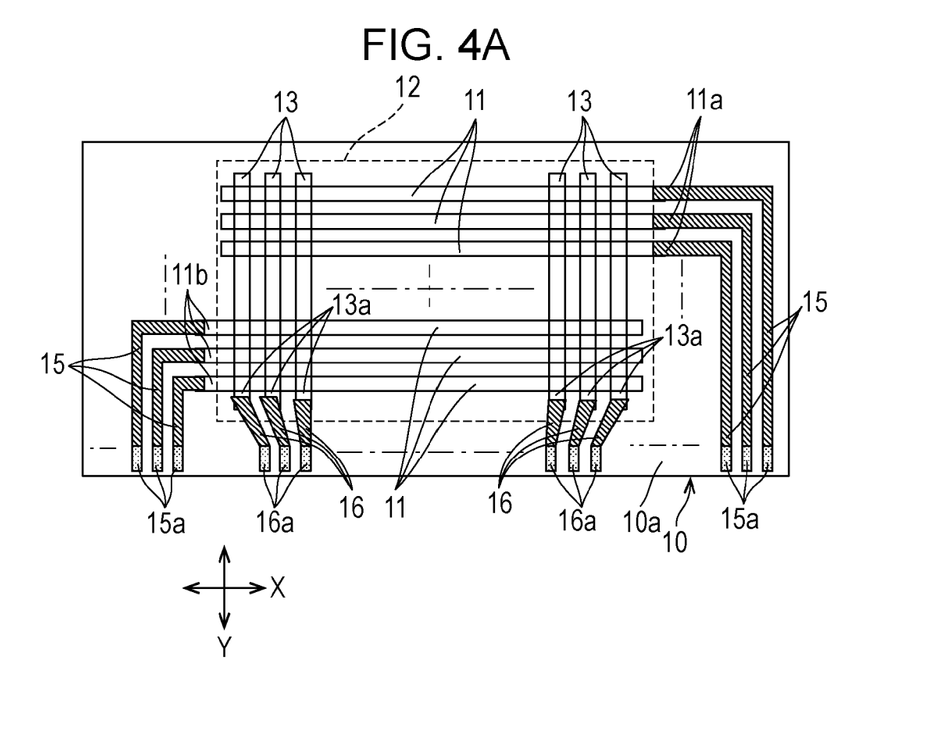
FIGS. 4A and 4B illustrate a process in which first wiring layers and second wiring layers have been formed in the method of manufacturing the input device in the first embodiment of the present invention, FIG. 4A being a plan view, FIG. 4B being a side view.
Figure 4B:
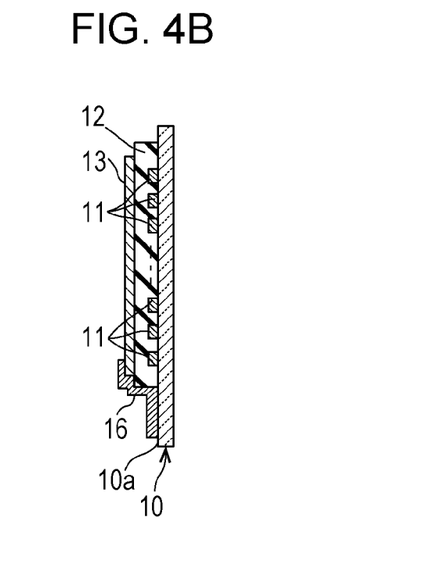
Figure 5:
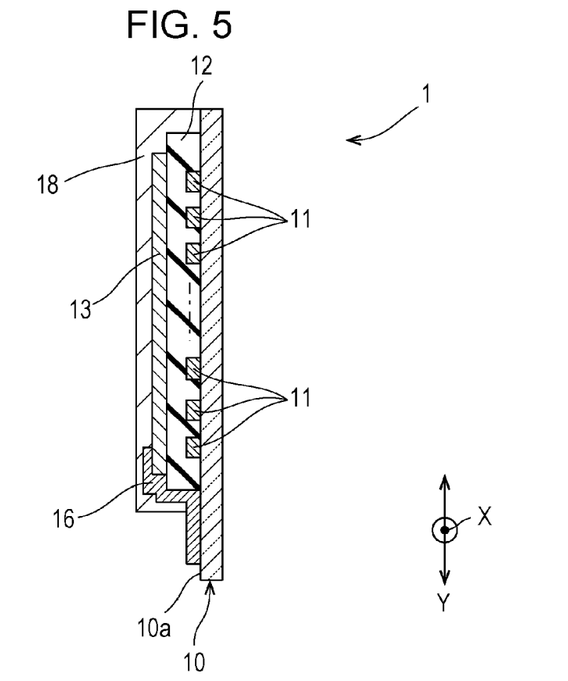
FIG. 5 is a side view illustrating a process in which a protective layer has been formed on the topmost part in the method of manufacturing the input device in the first embodiment of the present invention.

FIGS. 1A and 1B to FIG. 5 illustrate the method of manufacturing an input device 1 in a first embodiment of the present invention. FIG. 5 illustrates the structure of the input device 1 that has been completed.

Figure 1A:
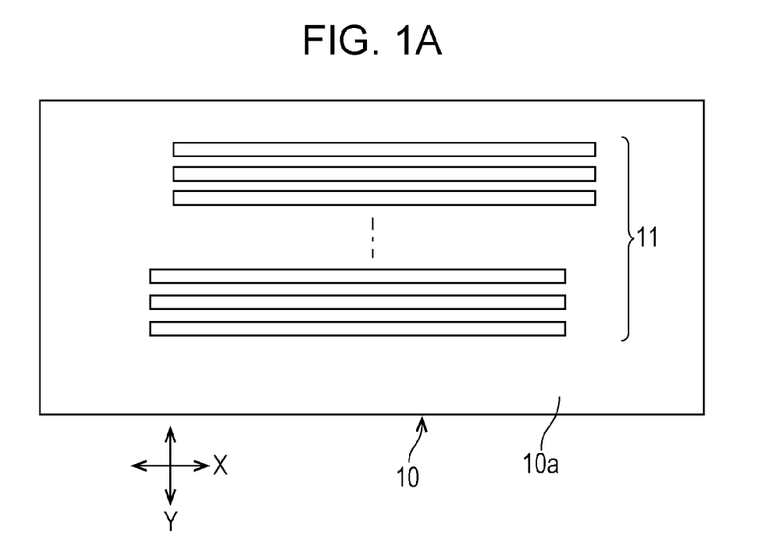
FIGS. 1A and 1B illustrate a process in which first electrode layers have been formed on a substrate in a method of manufacturing an input device in a first embodiment of the present invention, FIG. 1A being a plan view, FIG. 1B being a side view.
Figure 1B:
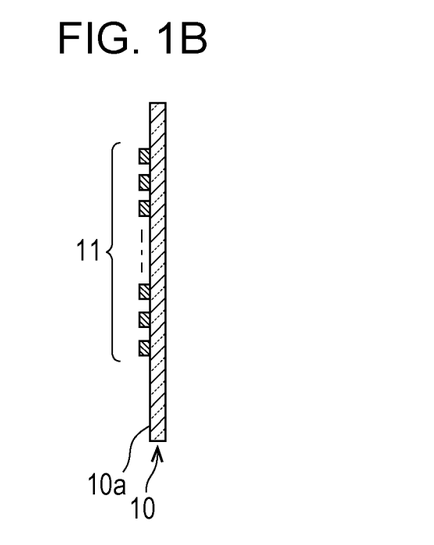

In the process illustrated in FIGS. 1A and 1B, first wiring layers 11 are formed on one surface 10a of a substrate 10. The substrate 10 is translucent and the first wiring layer 11 is also translucent. Translucency in this description indicates transparency as well. For example, translucency means a translucent function having a total light transmittance of 70 percent or more or preferably 80 percent or more.

The substrate 10 is a resin film made of PET (polyethylene terephthalate). The first wiring layer 11 is preferably formed from tin-doped indium oxide (TIO). The substrate 10 and first wiring layer 11 are formed from a laminate material in which a PET film and ITO are combined together. The laminate material is such that an ITO layer is laminated over the whole of a surface of the PET film with a hard coat layer or the like intervening therebetween. The ITO layer of the laminate material is covered with a resist layer and the resist layer other than the pattern of the first wiring layers 11 is removed by phtolithgraphy. Preferably, when the ITO layer in areas that are not covered with the resist layer is removed by wet etching, a pattern of the first wiring layer 11 is formed.

The substrate 10 may be formed from a flat plane made of a non-flexible synthetic resin or a glass plate. In this embodiment, however, the input device 1 can be made thin and flexible by using a resin film to form the substrate 10.

In each drawing, the X direction is the horizontal direction and the Y direction is the vertical direction. The first wiring layers 11 formed from ITO are formed so as to become a plurality of rows in a pattern in which they are mutually separated in the Y direction and extend continuously in the X direction.

Figure 2A:
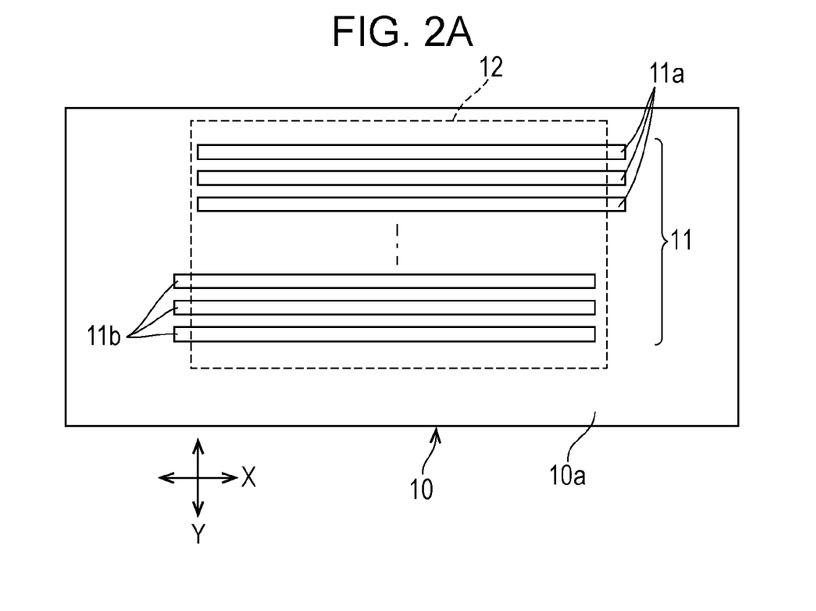
FIGS. 2A and 2B illustrate a process in which the first electrode layers are covered with an insulating layer in the method of manufacturing the input device in the first embodiment of the present invention, FIG. 2A being a plan view, FIG. 2B being a side view.
Figure 2B:
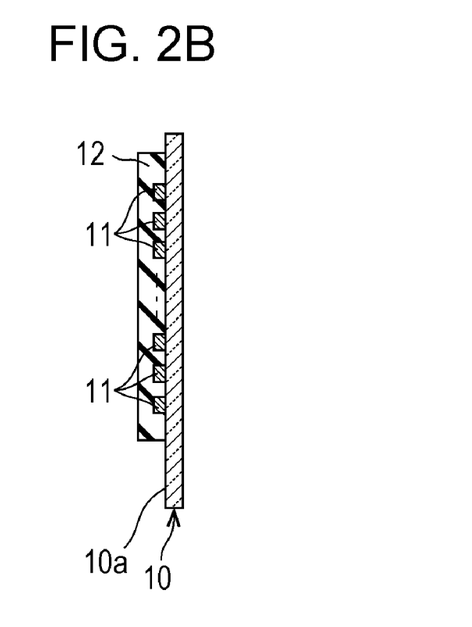

In the process in FIGS. 2A and 2B, the first wiring layers 11 are covered with an insulating layer 12. The insulating layer 12 is a translucent organic material layer. In this embodiment, the insulating layer 12 is formed from a transparent dry film resist. The dry film resist is placed on the surface 10a of the substrate 10, pressurized, and laminated. Development processing is performed by phtolithgraphy so that a rectangular shape indicated by dashed lines in FIG. 2A is left. The dry film resist in the rectangular shape is fixed in a heating process or the like, forming the insulating layer 12.

As illustrated in FIGS. 2A and 2B, most portions of the first wiring layers 11 are covered with the insulating layer 12, but right-side ends 11a of a plurality of first wiring layers 11, the right-side ends 11a being placed at the upper portion in FIG. 2A, protrude from the insulating layer 12 in the right direction in FIG. 2A, and the left-side ends 11b of a plurality of first wiring layers 11, the left-side ends 11b being placed at the lower portion in FIG. 2A, protrude from the insulating layer 12 in the left direction in FIG. 2A.

In the process in FIGS. 3A and 3B, second electrode layers 13 are formed on the surface of the insulating layer 12. The second electrode layer 13 is a translucent conductive layer including a conductive nanomaterial. The second electrode layer 13 is preferably formed in a printing process. For example, the second electrode layer 13 is formed by printing, as a conductive nanomaterial, a conductive ink in which conductive nanowires are distributed and mixed with a transparent binder. The conductive nanowire is based on, for example, copper, silver, or gold. It is also possible to use conductive nanotubes, that is, carbon nanotubes as a conductive nanomaterial that works as an alternative to the conductive nanowire. In this embodiment, silver nanowires are used.

A conductive ink including silver nanowires is pattern-printed on the surface of the insulating layer 12 by a screen printing method or the like. After having been subjected to a dry process or a heat process, the conductive ink is fixed on the surface of the insulating layer 12, forming the second electrode layers 13. As illustrated in FIG. 3A, the second electrode layers 13 are formed as a plurality of columns so that they are spaced in the X direction and are continuous in the Y direction. The first wiring layers 11 in a plurality of rows and the second electrode layers 13 in a plurality of columns cross each other at a plurality of points with the insulating layer 12 intervening therebetween so as to be insulated from each other.

At each end of the insulating layer 12, a step is formed between the surface 10a of the substrate 10 and the surface of the insulating layer 12, so the second electrode layer 13 is preferably formed only on an area on the surface of the insulating layer 12 by a printing process.

In the process in FIGS. 4A and 4B, first wiring layers 15 and second wiring layers 16 are formed.

In the process of forming the first wiring layers 15, a conductive paste is preferably used in which a conductive filler such as a silver-, copper-, or carbon-based conductive filler is included in a resin binder. The paste is pattern-printed on the surface 10a of the substrate 10 by a printing process such as screen printing. After having been subjected to a dry process or a heat process, the paste is fixed. In this embodiment, the first wiring layers 15 are formed from a silver paste. One end of each of a plurality of first wiring layers 15 formed on the right side in FIG. 4A is overlaid on the right-side end 11a of the relevant first wiring layer 11 and is brought into conduction with it. One end of each of a plurality of first wiring layers 15 formed on the left side in the drawing is overlaid on the left-side end 11b of the relevant first wiring layers 11 and is brought into conduction with it.

At the other end of the first wiring layer 15, a land 15a is formed at a position close to an edge of the substrate 10. The land 15a may be part of the first wiring layer 15 or may be formed from a sliver paste. Alternatively, the land 15a may be formed as a gold layer contiguous to the first wiring layer 15.

The second wiring layer 16 is continuously formed from the surface of the insulating layer 12 to the surface 10a of the substrate 10. The second wiring layer 16 is preferably formed in a printing process by using the same conductive paste as used for the first wiring layer 15, such as, for example, a sliver paste. As illustrated in FIG. 4B, however, since the second wiring layer 16 is formed so as to pass the step formed at the edge of the insulating layer 12 and be continuous from the surface of the insulating layer 12 to the surface 10a of the substrate 10, the second wiring layer 16 needs to have a thickness enough to prevent the second wiring layer 16 from being broken at the step. Therefore, the second wiring layer 16 is preferably formed by repeating a printing process based on screen printing or the like, that is, a process of applying a sliver paste, a plurality of times.

On the surface of the insulating layer 12, one end of each second wiring layer 16 is overlaid on the end 13a of the relevant second electrode layer 13 and is brought into conduction with it. The other end of the second wiring layer 16 becomes a land 16a at a position close to the edge of the substrate 10. The land 16a may be part of the second wiring layer 16 or may be formed from a sliver paste. Alternatively, the land 16a may be formed as a gold layer contiguous to the second wiring layer 16.

In the process illustrated in FIG. 5, the topmost part of the surface 10a of the substrate 10 is covered with a protective layer 18. The protective layer 18 is formed by applying a translucent organic material and curing it. The protective layer 18 is formed so as to cover all areas of the second electrode layers 13 and also covers most portions of the first wiring layers 15 and second wiring layers 16. The protective layer 18 is preferably formed in almost all areas except areas in which the lands 15a and lands 16a are exposed.

In a process described above, since the second electrode layers 13 are formed in a printing process, neither a sputtering process nor an etching process is necessary to form the second electrode layers 13. In addition, since the second electrode layers 13 are formed in a printing process, the insulating layer 12 can be formed from an organic material such as a dry resist, so the manufacturing processes can be simplified and manufacturing is possible at low costs.

The input device 1 that has been completed is illustrated in FIG. 5. In the input device 1, a central area, in which neither the first wiring layers 15 nor the second wiring layers 16 are formed, includes the translucent substrate 10, translucent first wiring layers 11, translucent second electrode layers 13, and translucent insulating layer 12. Therefore, the input device 1 can be used as a translucent touch panel and can be placed at the front of a display panel such as a color liquid crystal display panel.

In the input device 1, the first wiring layers 11 and second electrode layers 13 cross each other at many points with the insulating layer 12 intervening therebetween. A capacitance is formed between two electrode layers 11 and 13 at each cross point. A driving circuit and a detection circuit that have a multiplexer are connected to the first wiring layers 11 and second electrode layers 13. A pulse-shaped driving voltage is applied to the electrode layers of one type in succession and the electrode layers of the other type are connected to the detection circuit in succession. When a pulse-shaped driving voltage is applied, a current flows between the electrode layers 11 and 13 at its rising edge and falling edge. The amount of current at that time changes according to the capacitance between the electrode layers 11 and 13. When a finger or hand of a person approaches the substrate 10, charges move to the finger or hand, so the current between the electrode layers 11 and 13 changes at the position of the finger or hand, at which it is close to the substrate 10. When a change in the amount of current is detected in the detection circuit, the position of the finger or hand at that time is obtained as coordinate information.

The input device 1 is structured so that a plurality of first wiring layers 11 and a plurality of second electrode layers 13 cross each other at a plurality of points with the insulating layer 12 intervening therebetween. Therefore, when the first wiring layers 11 are connected to the driving circuit in succession and the second electrode layers 13 are connected to the detection circuit in succession, an access of a finger or a hand can be detected with high resolution. Accordingly, it becomes possible to detect a so-called multi-touch method, in which a manipulation made by a plurality of fingers is detected, with high resolution.

In addition, since the first wiring layers 11 and second electrode layers 13 are formed as different layers in a hierarchy, the forced routing of the wiring layers 15 and 16 becomes unnecessary and the wiring layers 15 and layers 16 do not need to be excessively prolonged, so an increase in wire resistance can be suppressed.

FIGS. 6 to 9 illustrate a method of manufacturing an input device 2 in a second embodiment of the present invention.

In the process in FIG. 6, the first wiring layers 11, first wiring layers 25, and ITO wiring layers 26, each of which is a layer below the relevant second wiring layer 16, are formed on one surface, denoted 10a, of the substrate 10. The ITO wiring layer 26 is an etching wiring layer.

The substrate 10 is formed from a PET film. The first wiring layer 11, which is translucent, is formed from an ITO layer. The first wiring layers 11 are formed as a plurality of rows so that they are spaced in the Y direction and are continuous in the X direction. The first wiring layer 25 is preferably formed by an ITO layer contiguous to the first wiring layer 11 and by a metal layer overlaid on this ITO layer. The metal layer in this embodiment is a copper layer. The ITO wiring layer 26 is formed at a position close to an edge of the substrate 10, the edge being at the lower portion in the drawing.

The first wiring layers 11, first wiring layers 25, and ITO wiring layers 26 are preferably formed by performing etching on a laminate material in which an ITO layer and a copper layer are laminated on a surface of a PET film. In the laminate material, the ITO layer is laminated over the whole of a surface of the PET film with a hard coat layer or the like intervening therebetween and the entire area of the surface of the ITO layer is covered with a copper layer. The surface of this laminate material is covered with a resist layer, after which the resist layer other than the shapes of the first wiring layers 11, first wiring layers 25, and ITO wiring layers 26 are removed by phtolithgraphy. The ITO layers and copper layers in areas that are not covered with the resist layer are removed by wet etching. Furthermore, copper layers that cover the first wiring layers 11 and copper layers that cover at least part of the ITO wiring layers 26 are removed by etching.

Figure 6:
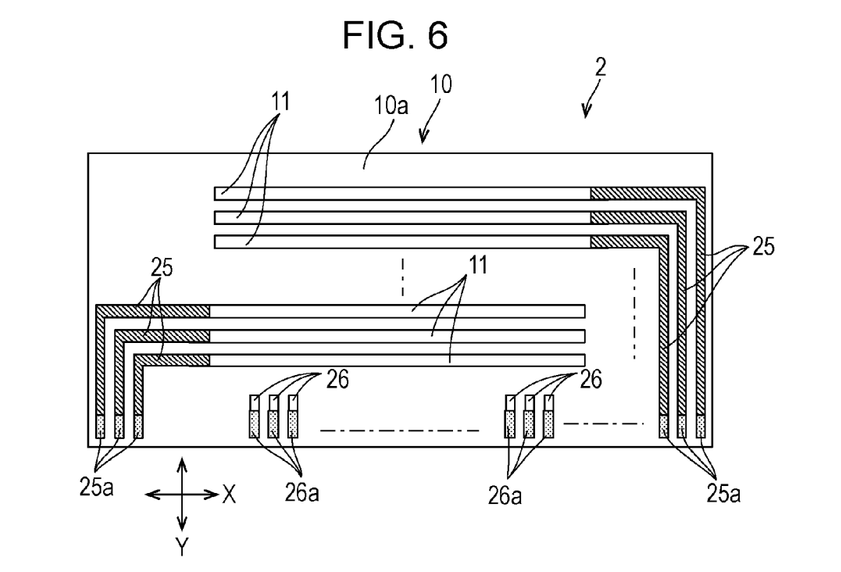
FIG. 6 is a plan view illustrating a process in which the first electrode layers, the first wiring layers, and ITO wiring layers (etching wiring layers) for the second wiring layers have been formed in an input device in a second embodiment of the present invention.

Upon the completion of the process described above, the first wiring layers 11, each of which is formed from an ITO layer, the first wiring layers 25, each of which is formed from an ITO layer, which is contiguous to the relevant first wiring layer 11, and from a copper layer laminated on the ITO layer, and the ITO wiring layers 26 are formed on the surface 10a of the translucent substrate 10, as illustrated in FIG. 6.

The first wiring layer 25 has a land 25a at a portion close to an edge of the substrate 10 at the lower portion in FIG. 6. The land 25a may be formed as part of the first wiring layer 25, in which an ITO layer and a copper layer are laminated, or may be structured by laminating a metal layer on a surface of the first wiring layer 25.

The ITO wiring layer 26 has a land 26a at a portion close to an edge of the substrate 10 at the lower portion in FIG. 6. The land 26a is formed by laminating an ITO layer and a copper layer as with the first wiring layer 25. Alternatively, the land 26a is formed by laminating a metal layer on a surface of the ITO wiring layer 26.

Figure 7:
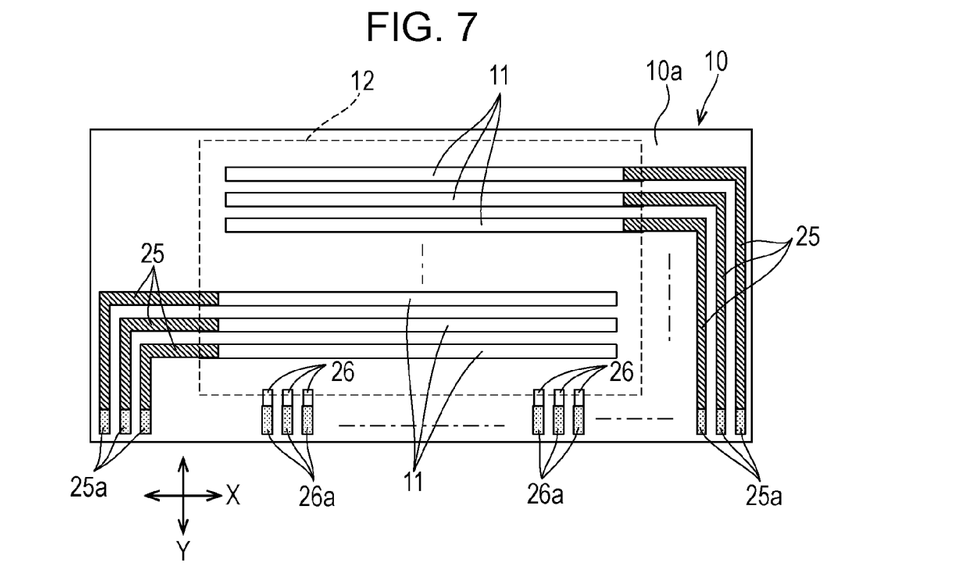
FIG. 7 is a plan view illustrating a process in which the first electrode layers are covered with the insulating layer in the method of manufacturing the input device in the second embodiment of the present invention.

In the process in FIG. 7, the first wiring layers 11 are covered with the insulating layer 12. The insulating layer 12 is formed from the same dry film resist as used in the process in FIGS. 2A and 2B in the first embodiment described above. The insulating layer 12 is formed so as to cover at least the whole of areas in which the first wiring layers 11 are formed.

Figure 8:
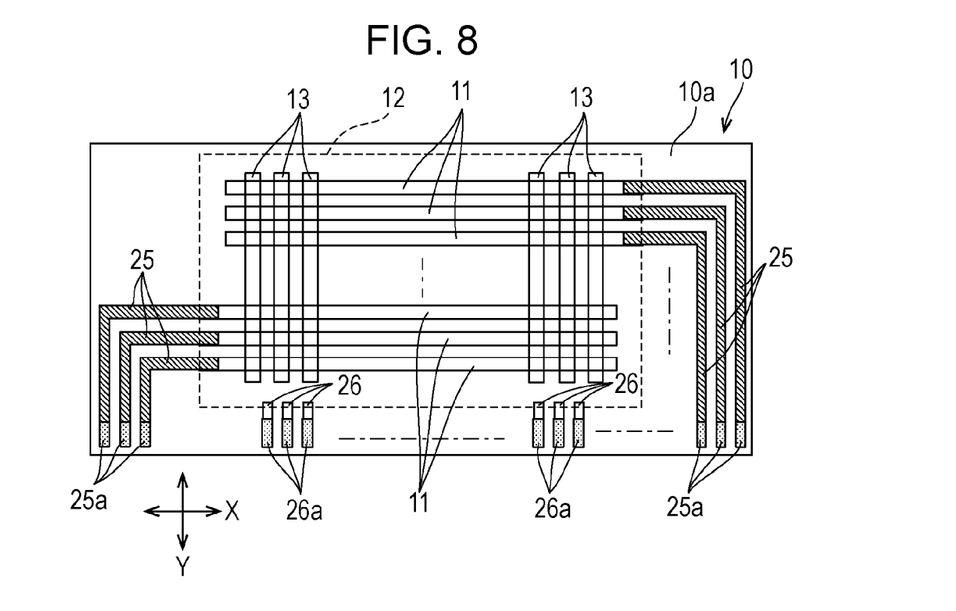
FIG. 8 is a plan view illustrating a process in which the second electrode layers have been formed on the surface of the insulating layer in the method of manufacturing the input device in the second embodiment of the present invention.

In the process in FIG. 8, the second electrode layers 13 are formed on the surface of the insulating layer 12. The second electrode layer 13 is preferably formed in a printing process by using the same conductive ink as used in the process in FIGS. 3A and 3B in the first embodiment described above. The second electrode layers 13 are formed as a plurality of columns so that they are spaced in the X direction and are continuous in the Y direction.

Figure 9:
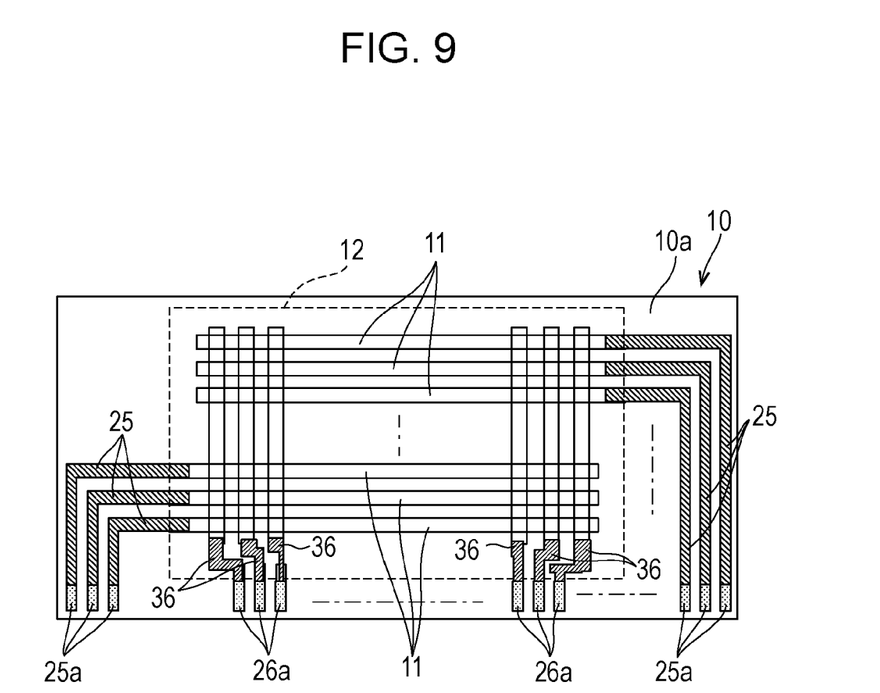
FIG. 9 is a plan view illustrating a process in which conductive paste wiring layers (printed wiring layers) for the second wiring layers have been formed in the method of manufacturing the input device in the second embodiment of the present invention.

In the process in FIG. 9, conductive paste wiring layers 36, each of which is the upper layer of the relevant second wiring layer 16, are formed. The conductive paste wiring layer 36 is preferably a printed wiring layer. The conductive paste wiring layer 36 is formed by applying a silver paste in a printing process and curing the silver paste as with the second wiring layer 16 formed in FIGS. 4A and 4B in the first embodiment described above. The conductive paste wiring layer 36 is connected to an end of the second electrode layer 13 formed on the surface of the insulating layer 12 by being overlaid on the end, extends to the surface 10a of the substrate 10, and is connected to the ITO wiring layer 26 by being overlaid on it. The second wiring layer 16 is formed from a laminated body of the ITO wiring layer 26 and conductive paste wiring layer 36. The conductive paste wiring layer 36 is formed so as not to be overlaid on the land 26a.

Since the conductive paste wiring layer 36 is formed at a step formed at an edge of the insulating layer 12, the conductive paste wiring layer 36 is preferably formed through a plurality of printing processes as with the second wiring layer 16 in the process in FIGS. 4A and 4B.

Upon the completion of the process in FIG. 9, the same protective layer 18 as illustrated in FIG. 5 is formed, completing the manufacturing of the input device 2 in the second embodiment.

With the input device 2 in the second embodiment, since, in the process in FIG. 6, the first wiring layer 25 is formed in an etching process together with the first wiring layer 11, a plurality of first wiring layer 25 can be placed so that they are brought close to one another. Therefore, the first wiring layers 25 can be placed at a high density in an area with a small width.

The ITO wiring layer 26, which is the lower layer of the second wiring layer 16, can also be formed in an etching process together with the first wiring layer 11, so the ITO wiring layers 26 can be placed at a high density in a narrow area.

An ITO layer can be etched with higher resolution than metal materials. Therefore, by forming the first wiring layers 25 and ITO wiring layers 26 from ITO, a pitch between wires of these wiring layers can be reduced and the first wiring layers 25 and ITO wiring layers 26 can thereby be placed at a high density in an area with a small width in a limited area.

In the second embodiment, etching is performed on an ITO layer so that the first wiring layers 25 and ITO wiring layers 26 are formed on the surface 10a of the substrate 10 at a high density. However, since the second electrode layer 13 is formed on the surface of the insulating layer 12 in a printing process and the conductive paste wiring layers 36 can also be formed in a printing process so as to cover steps at the edges of the insulating layer 12, a process of forming the ITO wiring layer 26 and the second wiring layer 16 connected to this ITO wiring layer 26 can be relatively easily performed.

In the embodiments described above, the first wiring layer 11 is formed from an ITO layer, but the first wiring layer 11 may be formed from, for example, a metal mesh layer. A metal mesh layer is formed by forming a low-resistance material such as a gold material on the surface 10a of the substrate 10 in a mesh shape.

Alternatively, the first wiring layer 11 may be formed from the same material as the second electrode layer 13 in a printing process.

What is claimed is:

1. An input device comprising:
    a translucent substrate comprised of a resin film;
    a translucent first electrode layer provided on the substrate;
    a translucent second electrode layer provided on the substrate, the second electrode layer including a conductive nanomaterial, the first electrode layer and the second electrode layer being insulated from each other;
    a first wiring layer provided on the substrate so as to be brought into conduction with the first electrode layer;
    a translucent insulating layer comprised of a dry film resist so as to cover the first electrode layer; and
    a second wiring layer connected to the second electrode layer; wherein:
    the first electrode layer and the first wiring layer are provided on a surface of the substrate,
    the second wiring layer is provided in a predetermine pattern on a surface of the insulating layer, and
    the second wiring layer extends from the surface of the insulating layer to the surface of the substrate.

2. The input device according to claim 1, wherein the first electrode layer comprises ITO.

3. The input device according to claim 1, wherein the first wiring layer comprises a conductive paste.

4. The input device according to claim 2, wherein the first wiring layer comprises an ITO layer contiguous to the first electrode layer and a metal layer provided on the ITO layer.

5. The input device according to claim 1, wherein the first electrode layer is etched.

6. The input device according to claim 1, wherein the second electrode layer is printed.

7. The input device according to claim 1, wherein the second wiring layer comprises a conductive paste.

8. An input device comprising:
a translucent substrate comprised of a resin film;
a translucent first electrode layer provided on the substrate;
a translucent second electrode layer provided on the substrate, the second electrode layer including a conductive nanomaterial, the first electrode layer and the second electrode layer being insulated from each other;
a first wiring layer provided on the substrate so as to be brought into conduction with the first electrode layer;
a second wiring layer including a wiring layer as a lower layer; and
a translucent insulating layer comprised of a dry film resist so as to cover the first electrode layer; wherein
the first electrode layer, the first wiring layer, and the wiring layer included in the second wiring layer as the lower layer are provided on a surface of the substrate,
the second wiring layer provided in a predetermine pattern on a surface of the insulating layer, and
the second wiring layer, which interconnects the second electrode layer and the wiring layer included in the second wiring layer as the lower layer, extends from the surface of the insulating layer to the surface of the substrate.

9. The input device according to claim 8, wherein the first electrode layer is etched.

10. The input device according to claim 8, wherein the second electrode layer is printed.

11. The input device according to claim 8, wherein the second wiring layer comprises a conductive paste.

12. The input device according to claim 8, wherein:
the first electrode layer has an ITO layer;
the first wiring layer has a laminated body of an ITO layer and a metal layer; and
the first electrode layer and the first wiring layer are etched.

13. The input device according to claim 8, wherein the first wiring layer and the wiring layer included in the second wiring layer as the lower layer are etched on the surface.

14. The input device according to claim 13, wherein the second wiring layer is printed.

15. A method of manufacturing an input device in which a translucent first electrode layer and a translucent second electrode layer are formed on a translucent substrate so as to be insulated from each other, the method comprising:
(a) forming the first electrode layer on a surface of the substrate, which is formed from a resin film;
(b) covering the first electrode layer with a translucent insulating layer formed from a dry film resist;
(c) forming the second electrode layer on a surface of the insulating layer in a predetermined pattern by using a conductive ink including a conductive nanomaterial;
(d) forming a first wiring layer that is brought into conduction with the first electrode layer on the surface of the substrate concurrently with the step in (a) above or in a different step; and
(e) forming a second wiring layer that is connected to the second electrode layer, from the surface of the insulating layer to the surface of the substrate.

16. The method according to claim 15, wherein the first electrode layer is formed in an etching process in the step in (a).

17. The method according to claim 15, wherein the second electrode layer is formed in a printing process in the step in (c).

18. The method according to claim 15, wherein the second wiring layer is formed from a conductive paste in the step in (e).

19. A method of manufacturing an input device in which a translucent first electrode layer and a translucent second electrode layer are formed on a translucent substrate so as to be insulated from each other, the method comprising:
(f) forming the first electrode layer, a first wiring layer contiguous to the first electrode layer, and a wiring layer included in a second wiring layer as a lower layer on a surface of the substrate, which is formed from a resin film;
(g) covering the first electrode layer with a translucent insulating layer formed from a dry film resist;
(h) forming the second electrode layer on a surface of the insulating layer in a predetermined pattern by using a conductive ink including a conductive nanomaterial; and
(i) forming the second wiring layer, which interconnects the second electrode layer and the wiring layer included in the second wiring layer as the lower layer, from the surface of the insulating layer to the surface of the substrate.

20. The method according to claim 19, wherein in the step in (f), the first electrode layer is formed from an ITO layer in an etching process and the first wiring layer is formed from a laminated body of an ITO layer and a metal layer in an etching process.

21. The method according to claim 19, wherein in the step in (f), the wiring layer included in the second wiring layer as the lower layer is formed on the surface of the substrate in an etching process, together with the first wiring layer.

22. The method according to claim 21, wherein in the step in (i), the second wiring layer is formed in a printing process.

23. An input device comprising:
a translucent substrate comprised of a resin film;
a translucent first electrode layer provided on the substrate;
a translucent second electrode layer provided on the substrate, the second electrode layer including a conductive nanomaterial, the first electrode layer and the second electrode layer being insulated from each other;
a first wiring layer provided on the substrate so as to be brought into conduction with the first electrode layer;
a translucent insulating layer comprised of a dry film resist so as to cover the first electrode layer; and
a second wiring layer connected to the second electrode layer; wherein:
the first electrode layer and the first wiring layer are provided on a surface of the substrate, and
the second wiring layer is provided in a predetermine pattern on a surface of the insulating layer.

* * * * *